H. A. BORRESEN.
WATCH BARREL.
APPLICATION FILED JULY 10, 1916.
1,339,941. Patented May 11, 1920.
3 SHEETS—SHEET 2.
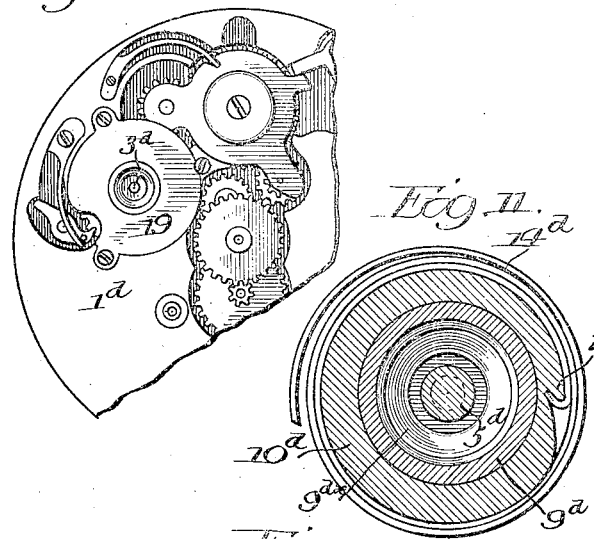
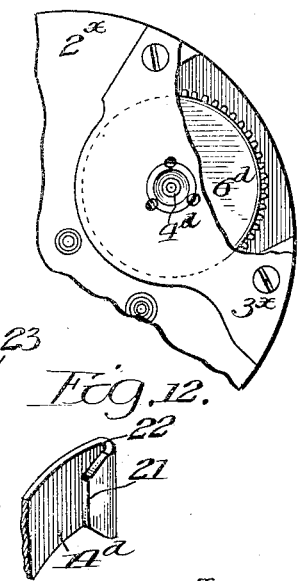
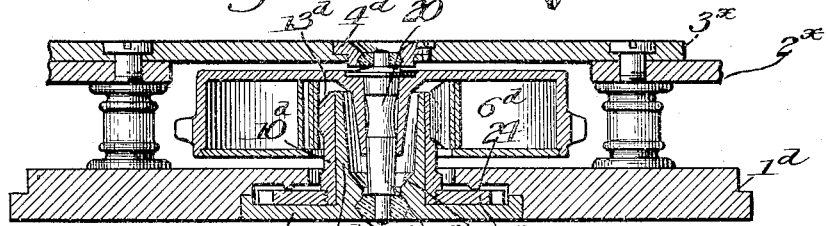
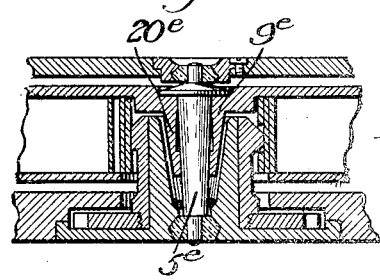
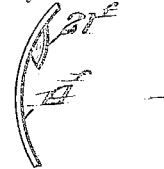
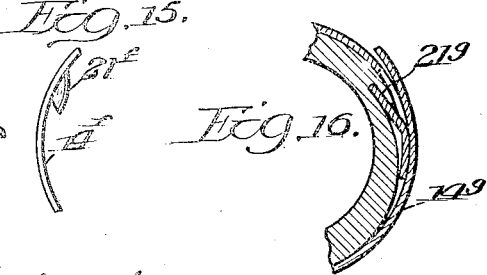
Inventor
Helge A. Borresen
by Max W. Zabel Atty

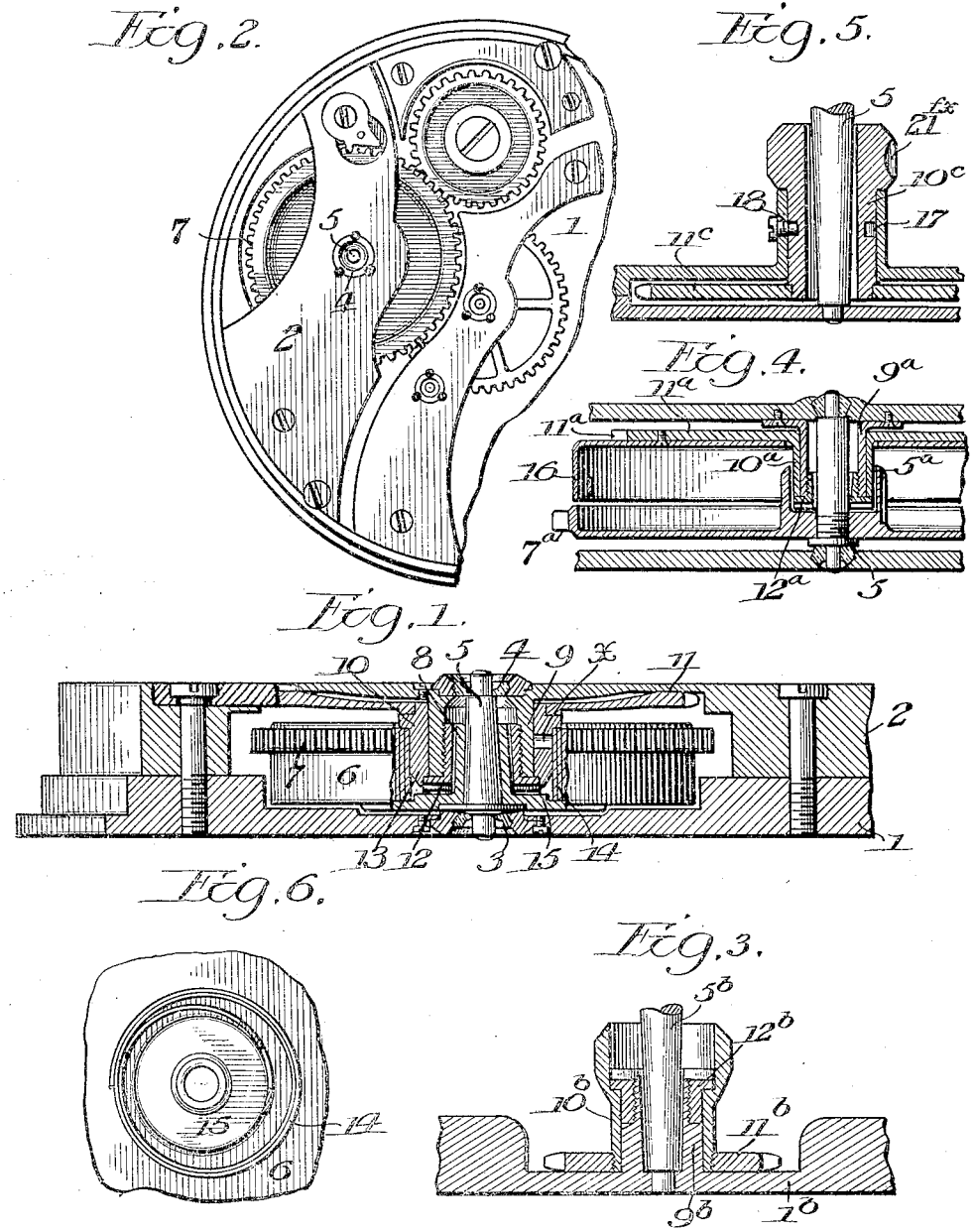

H. A. BORRESEN.
WATCH BARREL.
APPLICATION FILED JULY 10, 1916.

1,339,941.

Patented May 11, 1920.
3 SHEETS—SHEET 3.

Inventor
Helge A. Borresen
by Max W. Zabel Atty.

UNITED STATES PATENT OFFICE.

HELGE A. BORRESEN, OF MARQUETTE, MICHIGAN, ASSIGNOR OF ONE-HALF TO EDWARD R. HILLS, OF CHICAGO, ILLINOIS.

WATCH-BARREL.

1,339,941.  Specification of Letters Patent.  Patented May 11, 1920.

Application filed July 10, 1916. Serial No. 108,290.

*To all whom it may concern:*

Be it known that I, HELGE A. BORRESEN, a citizen of the United States, residing at Marquette, in the county of Marquette and State of Michigan, have invented a certain new and useful Improvement in Watch-Barrels, of which the following is a full, clear, concise, and exact description, reference being had to the accompanying drawings, forming a part of this specification.

My invention relates to main spring barrels for watches and more particularly to that type of main spring barrels in which the main wheel is rigidly attached to and rotates with the main arbor, the main arbor providing at its extremities the going pivots.

More particularly my invention is an improvement over my co-pending application Serial No. 48,982, filed Sept. 4, 1915.

One of the principal objects of my invention consists in the provision of means for preventing lateral movement of the hub or sleeve carrying the winding ratchet wheel, this hub being supported and rotating upon an annular sleeve fixedly mounted. This simplifies repair work and also the assembling of the watch. Due to this construction parts may be more compactly accommodated. One advantage occurring from this structure is the possibility of constructing the winding ratchet wheel with a spring-shaped design in certain models so that it may be yieldingly held against the movement plate. In this manner difficulties of adjustment are minimized and permanent alinements maintained. The structure is equally applicable in models in which the winding mechanism is adjacent either to the lower plate or the upper bridge, and is likewise readily applicable irrespective of whether the spring is wound from the inner or outer coils.

The structure furthermore, as fully shown, is such that it may be readily incorporated in all watch models of various types. My invention further contemplates the construction of the various parts such as the sleeves and arbors in such a way that the various parts readily telescope, suitable guiding means being provided whereby the parts automatically position themselves when being assembled. This is particularly true of my improved structure for engaging the inner extremity of the main spring to the winding arbor.

My invention further contemplates constructing the spring chamber in such a way that the inner convolutions of the spring are prevented from crossing the path of the winding arbor during the assembling operation. Thinner construction is devised for certain parts than heretofore, yet the arrangement is such that the main spring bridge and the ratchet wheel, for instance, are reinforced at certain portions where such reinforcements are desirable.

The invention contemplates that the winding mechanism associated with the winding arbor shall perform its function without in any way placing the main arbor and main wheel under stress, or without using said arbor as a bearing for any of the winding parts mentioned.

Further features of my invention contemplate the arrangement of the main arbor in such a way that it is readily introducable into its supports and that it may support the main spring barrel, if desired, throughout substantially the thickness of said barrel.

All of these and other features and functions will be readily clear from the detailed description of various forms of carrying out my invention which I will now give in connection with the accompanying drawings illustrating such embodiments, in which:

Figure 1 is a transverse sectional view of a barrel structure constructed in accordance with my invention;

Fig. 2 is a top view of said structure incorporated in a fragmentary view of a watch;

Fig. 3 is a fragmentary view sectional in character like Fig. 1 illustrating the structure applied to a watch having the winding mechanism disposed in the lower plate;

Fig. 4 is a view similar to Fig. 1 showing the structure applied to a barrel winding the spring from the outer coil;

Fig. 5 is a view fragmentary in character like Fig. 3 showing a further modified form;

Fig. 6 is a fragmentary plan view showing the annular shoulder of the barrel shown in Fig. 1;

Fig. 7 is a view similar to Fig. 1 showing the winding ratchet in the lower movement plate and upward removability of barrel through opposite movement plates;

Fig. 8 is a plan view of the structure shown in Fig. 7 incorporated in a fragmentary view of a watch;

Fig. 9 is a fragmentary view similar to Fig. 7 of a modified form of structure;

Fig. 10 is a plan view of Fig. 7 illustrating the opposite side of the movement shown in Fig. 8;

Fig. 11 is a sectional view illustrating the attaching means for the main spring;

Fig. 12 is a detail perspective view of the extremity of the inner main spring coil;

Figs. 13 and 14 are views showing modified forms of the extremity of the inner spring coils;

Fig. 15 is a side view of the structure shown in Fig. 13;

Fig. 16 is a sectional view of the structure shown in Fig. 14 incorporated with the winding arbor;

Figure 18:
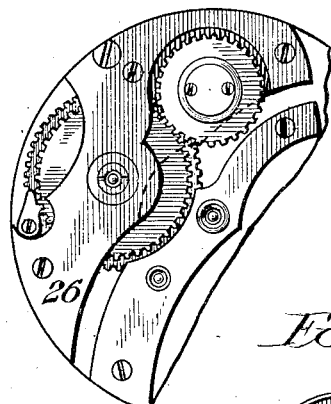
Fig. 18 is a plan view of the structure shown in Fig. 17.

Referring more particularly to Figs. 1 and 2, I show a lower movement plate 1 and main spring bridge 2 provided respectively with jewel bearing structures 3 and 4 adapted to support the main arbor 5. This main arbor carries the main spring barrel 6 carrying the main wheel 7. The barrel 6 has an inwardly extending hub 8 which is secured to the main arbor 5. The main spring bridge 2 has an inwardly extending annular sleeve 9 about which rotates the hub 10 carrying the winding ratchet 11, the winding ratchet and hub 10 being of course fixedly secured together. The hub 10 when mounted in place is held against lateral play by the nut 12 which has screw threaded engagement with the interior of the supporting sleeve 9. It will be noted that the nut 12 overhangs the exterior of the sleeve 9 so that it prevents endwise play downwardly of the hub 10. Instead of having the hub 10 abut directly the main spring bridge to prevent lateral play in the other direction, I have shaped the winding ratchet 11 concave and thinned down so that it is spring-like and so that the periphery of this winding ratchet engages the main spring bridge with a slight pressure, thus absolutely maintaining the alinement of the parts thus mentioned. The hub 8 of the barrel, together with its arbor 5 are rotatably supported independently of the rotating winding ratchet or its associated parts. The hub 10 of the winding ratchet is beveled as shown more clearly at 13 so that when introducing the barrel 6 together with the main spring 14, this beveled portion will expand the inner main spring coil into position about the said hub 10. In order that these parts may be lubricated without dismantling, the oil hole $x$ is provided and located at the most desirable point for the diffusion of the oil.

It is very essential to prevent the inner convolutions of the main spring from crossing the path of the winding arbor 10 when the main spring and barrel are being mounted in position, and in order to retain the main spring out of this zone, I provide a projecting portion 15 which extends inwardly from the face of the barrel, which annular projection 15 lies approximately in the path of these inner convolutions, thus serving to locate the inner spring coil for automatic assembling. The main spring bridge 2, as will be noted more clearly from Fig. 1, is made gradually very thin so as to accommodate the parts, yet strong at its central portion where the bearing 4 is provided, and this bridge is thereby reinforced to accommodate more readily the said bearing and the parts associated therewith, thus providing a reinforced construction where it is necessary and permitting a thin construction where it is desirable in order to accommodate the moving parts compactly.

Fig. 1 clearly demonstrates that the ratchet wheel 11 and the bridge 2 may alternately be constructed thin and thick at certain desirable points so as to automatically aline and maintain the parts compactly. The fact that the combined space occupied by the ratchet wheel and bridge both is practically no more than the usual space required for either proves the importance of the construction in the present day endeavors for thin model construction.

Fig. 4 illustrates that the maintaining nut $12^a$ and the supporting sleeve $9^a$ are equally applicable to a structure in which the spring is wound from the outer coil by means of the annular rim 16 fixedly associated with the winding ratchet $11^a$. The winding ratchet itself has a depending sleeve or hub $10^a$ which rotates upon the bearing sleeve $9^a$. A shouldered nut $12^a$ again holds the parts against lateral displacement, thus preventing the elements $9^a$, $10^a$, $11^a$ and 16 from coming out of place whenever the main spring together with the main wheel $7^a$ are removed. Again in Fig. 4 the rotating parts are rotatably mounted independently of each other.

In Fig. 3, I show a modified form of the device in which the winding ratchet $11^b$ is mounted against the lower movement plate $1^b$, which lower movement plate again rotatably supports one extremity of the main arbor 5b. The lower movement plate has a projecting sleeve 9b, which again rotatably supports the hub 10b carrying the winding ratchet 11b. A shouldered nut 12b again serves the purpose of preventing lateral play of the winding ratchet and its associated parts, as will be readily apparent.

In Fig. 5, I show a modified form of securing the winding ratchet 11c against displacement by providing its hub 10c with an annular recess 17 with which a set screw 18 coöperates to hold the parts against lateral displacement. It will be apparent from these various structures thus far explained that the various parts constituting the main spring barrel structure can be readily taken apart without displacing the winding parts as the respective mechanisms are distinct and perform their functions independently.

In Figs. 7, 8 and 10, I show a modified form of the invention as applied to a watch model, in which the winding ratchet 11d is mounted in the lower movement plate 1d. The lower movement plate carries the bridge plate 19 which has an annular sleeve 9d. The winding ratchet 11d with its extending hub 10d is mounted on this sleeve 9d and is rotatable thereon. The winding ratchet is confined in the space between the movement plate 1d and the bridge 19. The main arbor 5d carries the spring barrel 6d and is mounted in bearings 3d and 4d fixedly carried as illustrated. The main arbor 5d is tapered as shown and is provided with a circumferentially grooved portion 20, which thus transforms this arbor into a structure having maximum bearing supports as far apart as possible, and permitting an accurate alining drive fit. Figs. 7, 8, and 10 demonstrate the practicability of mounting the winding mechanism in the lower plate, yet removing the barrel and main wheel upwardly through the upper movement plate 2× by simply removing the bridge 3×. In order to automatically guide home the main arbor 5d into its bearings 3d the sloping shouldered recess 9d× is provided.

In Fig. 9, I show a modified form of the structure in which the groove 20e is provided in the sleeve 9e, instead of being provided on the arbor 5e.

By referring more particularly to Figs. 7, 11 and 12, I show a preferred form of attaching the inner extremity of the main spring. The hub 10d is beveled as shown at 13d so that the main spring may automatically be forced home. In order further to procure an automatic meeting of the parts I have the inner extremity 21 of the main spring 14d beveled as shown more clearly in Fig. 12. Hooks provided on the inner coil of the main spring to be used in combination with the old type barrel with a stationary arbor need not possess the automatic assembling principles as herein provided as the assembling of these various parts are performed before the barrel is introduced into the watch movement, while in my type of construction the assembling of these parts must be automatically accomplished as the barrel is introduced into the movement, and as shown in Figs. 7, 11, 12, 13, 14, 15 and 16, several modifications have been devised to make my combination practical and easily manipulated. The main spring extremity is bent as shown at 22 in order to coöperate with a lip 23 provided upon the hub 10d. Thus the main spring barrel, together with the main spring, are moved in a position telescopingly around the hub 13d and then a rotation of the winding ratchet 11d causes the eventual engagement of the tongue 21 by the lip 23, as is apparent from Fig. 11. In order further to guide the winding ratchet 11d, I provide an annular rim 24 as shown in Fig. 7, which more accurately confines this winding ratchet in position.

In Figs. 13 and 15, I show a modified form of the structure shown in Fig. 12 in that the main spring 14f has a cup-shaped projection 21f formed therefrom, and would properly aline and engage the corresponding recess shown as 21fx, Fig. 5.

In Figs. 14 and 16, I show a further modification in which the main spring 14g has a punched V-shaped straight tongue 21g.

Figure 19:
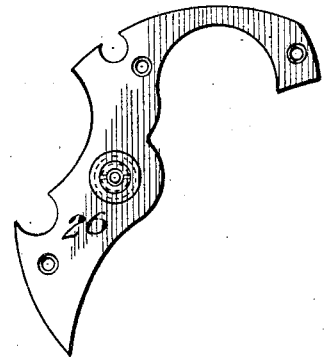
Fig. 19 is a detail view of the punched out bridge.
Figure 17:
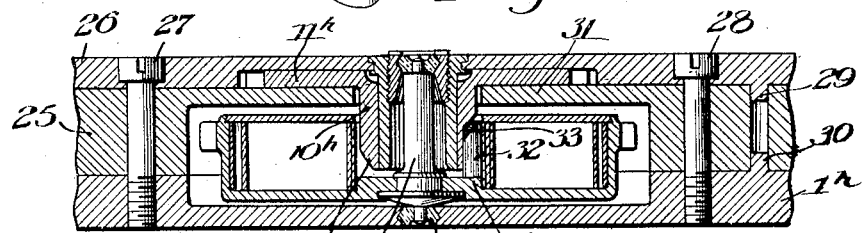
Fig. 17 is a view similar to Fig. 1 showing a form of the invention illustrating the avoidance of profiling.
Figure 21:
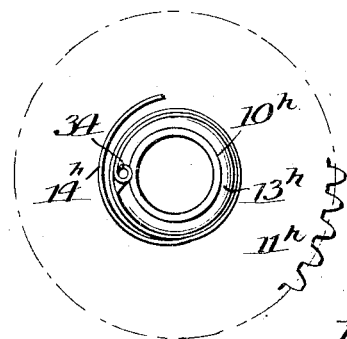
Fig. 21 is a plan view illustrating the engagement of the main spring with the winding arbor.

Referring more particularly to Figs. 17, 18 and 19, I show a structure in which the usual and expensive profiling is to a large extent avoided. The lower movement plate 1h again accommodates the bearing 3h for the main arbor 5h. The winding bridge however is in two parts, respectively the parts 25 and 26, all of which are held together by the screws 27 and 28. Suitable pins 29 and 30 cause proper alinement of the parts. The winding ratchet 11h is confined between these two parts, as readily apparent from Fig. 17. It will be noted that by making this bridge in two parts it is unnecessary to cut out the usual deep recessed portions which it is necessary ordinarily to provide in order to accommodate the various parts and their mountings. As the supporting plate is made in layers it is seen that the usual profiling may be to a large extent avoided and portions such as the section 31 is an integral part of the bridge 26 and will confine the winding ratchet and prevent lateral play without the use of auxiliary means such as illustrated in connection with Fig. 1.

Fig. 18 demonstrates that the bridges 25 and 26 afford a simple construction, and Fig. 19 demonstrates that the inexpensive punched out bridge may supersede expensive profiling work.

By referring more particularly to Figs.

Figure 20:
Fig. 20 is a detail perspective view of the extremity of the main spring structure shown in Fig. 17.

17, 20 and 21, I show an improved structure for engaging the inner extremities of the main spring 14ʰ. This structure includes the provision at the extremity of the main spring of a cylindrical section 32 beveled as shown at 33. This beveled portion readily slides on the bevel portion 13ʰ of the hub 10ʰ. The hub 10ʰ is then provided with a circular recessed portion 34 to accommodate this rounded extremity of the main spring. The main spring extremity in order to coöperate properly with the annular projection 15ʰ has a portion of the cylindrical extremity 32 cut away as shown more clearly in Figs. 17 and 20 so that the cylindrical portion may move inwardly over the projection 15ʰ, said projection however still maintaining the inner convolutions of the spring out of the path of the arbor 10ʰ.

Figures 22, 23:
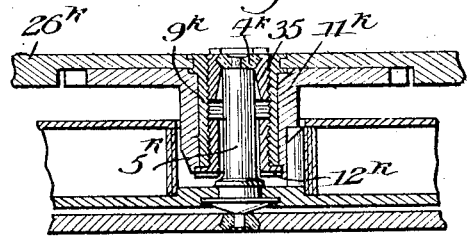
Fig. 22 is a view similar to Fig. 1 showing a modified form.
Fig. 23 is a detail view of a split hollow supporting screw.

Fig. 22 illustrates the structure shown in Fig. 1 as having the sleeve 9ᵏ interiorly threaded throughout as shown at 35. This permits the nut 12ᵏ and the jewel mounting 4ᵏ to be accommodated adjustably by the same means, and by splitting the nut 12ᵏ or the jewel mounting 4ᵏ in any suitable manner as for instance shown in Fig. 23, slot 36, the proper end shake as well as a permanent lodgment of the parts are simply but effectively secured.

In the claims I specify that the winding parts and barrel parts are frictionally independent of each other. I do not wish this term to be understood as excluding the likely use of jewel bearings, because jewel bearings in watch construction have, when properly made to support spindles, been always classed as non-frictional in their character.

From what has been described it will be readily apparent that my invention is capable of many and various modifications.

Having however thus described certain forms which my invention may take, what I claim as new and desire to secure by Letters Patent is:

1. A watch having a winding ratchet, an annular winding arbor to which said ratchet is secured, an annular sleeve upon which said arbor is rotatably mounted carried on a stationary part of the movement of the watch, means carried by the sleeve to prevent the arbor moving longitudinally on the sleeve, a main arbor interiorly of said winding arbor, means for rotatably carrying said arbor independently of said winding arbor, and means for preventing said winding arbor from frictionally influencing said main arbor.

2. A watch having a winding ratchet, an annular winding arbor to which said ratchet is secured, an annular sleeve upon which said arbor is rotatably mounted carried on a stationary part of the movement of the watch, a nut on said sleeve to prevent the arbor moving longitudinally on the sleeve, a main arbor interiorly of said winding arbor, means for rotatably carrying said arbor independently of said winding arbor, a main spring barrel, a main spring associated with said main arbor, and means independently of said barrel and main arbor for preventing lateral displacement of said winding arbor.

3. A watch having a resilient winding ratchet, an annular winding arbor to which said ratchet is secured, an annular sleeve upon which said arbor is rotatably mounted carried on a stationary part of the movement of the watch, a main arbor interiorly of said winding arbor, a barrel fixedly mounted upon said main arbor, means for rotatably carrying said arbor independently of said winding arbor, and means independently of said main arbor and barrel associated with one extremity of said winding arbor for pressing said ratchet against a stationary part of the watch movement.

4. A watch having a winding ratchet, an annular winding arbor to which said ratchet is secured, an annular sleeve upon which said arbor is rotatably mounted carried on a stationary part of the movement of the watch, a main arbor interiorly of said winding arbor, means for rotatably carrying said main arbor, and means for preventing said winding arbor from frictionally influencing said main arbor, said last aforesaid means including a flanged nut on said sleeve and engaging said arbor.

5. A watch having a winding ratchet, an annular winding arbor to which said ratchet is secured, an annular sleeve upon which said arbor is rotatably mounted carried on a stationary part of the movement of the watch, a main arbor interiorly of said winding arbor, means for rotatably carrying said main arbor, and means for preventing endwise displacement of said winding arbor, said last aforesaid means including a flanged nut screw threadedly engaging the interior of said annular sleeve.

6. A watch having a winding ratchet, an annular winding arbor to which said ratchet is secured, an annular sleeve upon which said arbor is rotatably mounted carried on a stationary part of the movement of the watch, a main arbor interiorly of said winding arbor, bearings for rotatably carrying said arbor independently of said winding arbor, and means for preventing endwise displacement of said winding arbor, said last aforesaid means including a flanged nut screw threadedly engaging the interior of said annular sleeve, one of said bearings being carried centrally of said annular sleeve.

7. A watch having a winding ratchet, an annular winding arbor to which said ratchet is secured, an annular sleeve upon which said arbor is rotatably mounted, and a main spring bridge to which said annular sleeve is secured, said bridge having a portion of its area of thin material and having the sleeve supporting portion of its length of increased thickness, and said winding ratchet having the material near the periphery thereof of an increased thickness, said portion of increased thickness alining with the portion of decreased thickness of said main spring bridge.

8. A watch having a winding ratchet, an annular winding arbor to which said ratchet is secured, an annular sleeve upon which said arbor is rotatably mounted, a main spring arbor, a main spring bridge to which said annular sleeve is secured, said bridge having a portion of its area of thin material and having the sleeve supporting portion of its area of increased thickness, and said winding ratchet having the material near the periphery thereof of an increased thickness, said portion of increased thickness alining with the portion of decreased thickness of said main spring bridge, and a bearing for the main arbor carried by said bridge at its portion of increased thickness.

9. A watch having a winding ratchet, an annular winding arbor to which said ratchet is secured, an annular sleeve upon which said arbor is rotatably mounted carried upon a stationary part of the movement of the watch, a nut on said sleeve adapted to retain the arbor on the sleeve, a main spring barrel having a hub, a main arbor interiorly of said winding arbor, said main arbor being tapered and engaging a tapered hole in said hub, and means for rotatably carrying said arbor independently of frictional engagement with said winding arbor.

10. A watch having a winding ratchet, an annular winding arbor to which said ratchet is secured, an annular sleeve upon which said arbor is rotatably mounted carried upon a stationary part of the movement of the watch, a main spring barrel having a hub, a main arbor interiorly of said winding arbor, said main arbor being tapered and engaging a tapered hole in said hub, and means for rotatably carrying said arbor independently of frictional engagement with said winding arbor, said main arbor having a bearing engagement with said hub throughout substantially the entire thickness of said barrel.

11. A watch having a winding ratchet, an annular winding arbor to which said ratchet is secured, an annular sleeve upon which said arbor is rotatably mounted carried upon a stationary part of the movement of the watch, means on the sleeve to prevent end-wise movement of the arbor on the sleeve, a main spring barrel having a hub, a main arbor interiorly of said winding arbor, said main arbor being tapered and engaging a tapered hole in said hub, and means for rotatably carrying said main arbor independently of frictional engagement with said winding arbor.

12. A watch having a winding ratchet, an annular winding arbor to which said ratchet is secured, a main spring barrel, a main spring, and a stop provided upon said main spring barrel in the path of the inner convolutions of said main spring to prevent said convolutions from crossing the path of the said arbor when the parts are being assembled.

13. A timepiece having a main spring bridge provided with a depending tube, a hollow winding arbor supported upon said tube, and screw threaded means for engaging the extremity of said tube to maintain said hollow winding arbor in position on said tube.

14. A watch having a winding ratchet, an annular winding arbor to which said ratchet is secured, an annular sleeve upon which said arbor is rotatably mounted carried on a stationary part of the movement of the watch, means to retain the arbor on the sleeve with the ratchet in contact with said stationary part, a main arbor interiorly of said winding arbor, a main spring barrel fixedly secured to said main arbor, means for rotatably carrying said arbor independently of said winding arbor, and means for preventing said winding arbor from frictionally influencing said main arbor and barrel.

15. A watch having a winding ratchet, an annular winding arbor to which said ratchet is secured, an annular interiorly threaded sleeve upon which said arbor is rotatably mounted carried on a stationary part of the movement of the watch, a nut on the sleeve to prevent endwise movement of the arbor on the sleeve, said nut engaging the threads of said sleeve, a main arbor interiorly of said winding arbor, means for rotatably carrying said arbor, and means for preventing said winding arbor from frictionally influencing said main arbor.

16. A watch having a winding ratchet, an annular winding arbor to which said ratchet is secured, an annular sleeve upon which said arbor is rotatably mounted carried on a stationary part of the movement of the watch, a nut on the sleeve to prevent endwise movement of the arbor on the sleeve, a main arbor interiorly of said winding arbor, a main spring barrel fixedly secured to said main arbor, means for rotatably carrying said arbor, and means for preventing said winding arbor from frictionally influencing said main arbor and barrel.

17. A watch having a winding ratchet, an annular winding arbor to which said ratchet is secured, an annular sleeve upon which said arbor is rotatably mounted carried on a stationary part of the movement of the watch, a main arbor interiorly of said winding arbor, a main spring barrel fixedly secured to said main arbor, means for rotatably carrying said arbor independently of said winding arbor, and means for preventing said winding arbor from frictionally influencing said main arbor and barrel, said annular sleeve extending into said barrel a distance equal to a substantial portion of the width of said barrel.

18. A watch having a plate member and a bridge member, an annular sleeve carried by one of said members, a main arbor supported by said members, and a winding arbor carried by said sleeve, said winding arbor being out of contact with said main arbor.

19. A watch having a plate member and a bridge member, an annular sleeve carried by one of said members, a main arbor supported by said members, a winding arbor carried by said sleeve, a means on said sleeve to prevent endwise movement of the arbor on the sleeve, said winding arbor being free from frictional engagement with said main arbor.

In witness whereof, I hereunto subscribe my name this 1st day of July, A. D. 1916.

HELGE A. BORRESEN.

Witness:
 HAZEL A. JONES.